United States Patent [19]

Sakaegi et al.

[11] Patent Number: 5,010,423
[45] Date of Patent: Apr. 23, 1991

[54] TRACKING DEVICE AND METHOD

[75] Inventors: Yuji Sakaegi, Tokyo; Nobuo Fukushima, Kanagawa, both of Japan

[73] Assignee: Canon Kabushiki Kaisha, Tokyo, Japan

[21] Appl. No.: 442,383

[22] Filed: Nov. 27, 1989

Related U.S. Application Data

[63] Continuation of Ser. No. 51,479, May 18, 1987, abandoned.

[30] Foreign Application Priority Data

May 21, 1986 [JP] Japan .................................. 61-116954

[51] Int. Cl.$^5$ .............................................. G11B 5/596
[52] U.S. Cl. ................................ 360/77.06; 360/78.13
[58] Field of Search ................. 360/77.06, 77.02, 78.13

[56] References Cited

U.S. PATENT DOCUMENTS

| 4,445,153 | 4/1984 | Fujimoto | 360/109 |
| 4,485,418 | 11/1984 | Bremmer | 360/77 |
| 4,499,510 | 2/1985 | Harding et al. | 360/78 |
| 4,677,506 | 6/1987 | Kaneko et al. | 360/77 |
| 4,689,700 | 8/1987 | Miyake et al. | 360/77 |
| 4,710,832 | 12/1987 | Itoh | 360/77 |
| 4,729,040 | 3/1988 | Miyake | 360/77 |
| 4,731,680 | 3/1988 | Moriyama et al. | 360/77 |

Primary Examiner—Aristotelis M. Psitos
Assistant Examiner—David L. Robertson
Attorney, Agent, or Firm—Robin, Blecker, Daley & Driscoli

[57] ABSTRACT

A tracking device is disclosed. When a target track is indicated by indicating means, the head is shifted toward the target track. During this time, prior to the detecting the signal for a position of the target track, the signals for the adjacent positions to the position of the target track on either side are detected, and, after that, the signal for the position of the target track is detected. Based on the outputs of these positions, discriminating means determines the position to which the head is tracked relative to the recording medium.

12 Claims, 5 Drawing Sheets

FIG.2
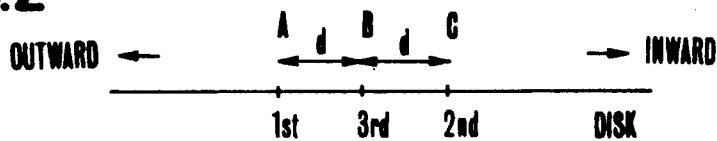
FIG.3
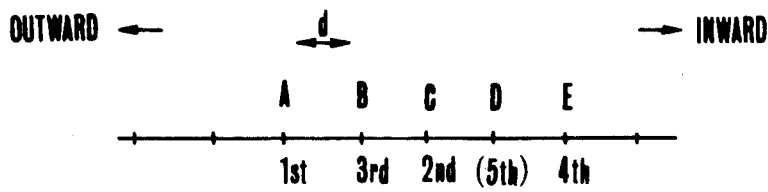
FIG.4(a) MAXIMUM AT POINT B
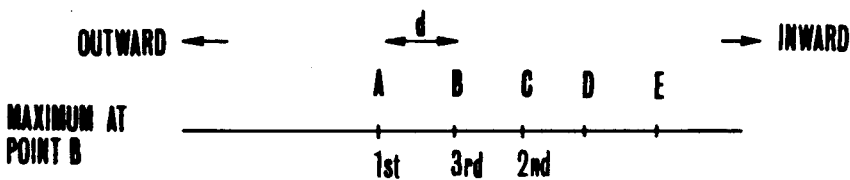
FIG.4(b) MAXIMUM AT POINT C
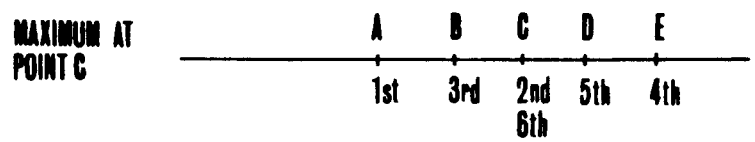
FIG.4(c) MAXIMUM AT POINT D
FIG.4(d) MAXIMUM AT POINT E
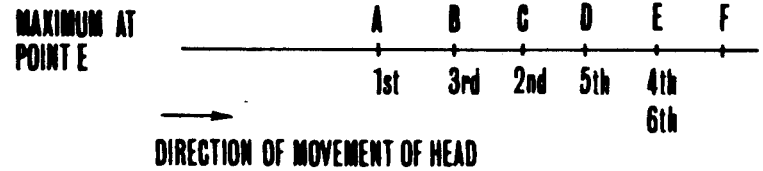
DIRECTION OF MOVEMENT OF HEAD

OUTWARD ←――――――――――――→ INWARD
DIRECTION OF MOVEMENT OF HEAD

TRACKING DEVICE AND METHOD

This application is a continuation, of application Ser. No. 051,479, filed May 18, 1987, now abandoned.

BACKGROUND OF THE INVENTION

1. Field of the Invention

This invention relates to a tracking device and method, and more particularly to an automatic tracking device and method suited for use in the apparatus in which, when reproducing the TV signals or like signals recorded in frequency-modulated form on the concentric circular tracks of a rotary recording medium, the tracking of the reproducing head to the recording track is controlled, while the level of the reproduced signal is monitored.

2. Description of the Related Art

The method of recording TV signals for one field or frame of a still picture on each of concentric, circular tracks in a rotating recording medium has found its use in many recording and reproduction apparatus. FIG. 6 is a schematic plan view illustrating the recording format on the recording medium in the case when such a conventional magnetic recording method is employed. A magnetic recording sheet 2 as the rotary recording medium is rotated about a central axis C by a drive source (not shown). For TV signals of, for example, the NTSC standard, when recording or reproducing them by one field or one frame, the speed of the magnetic sheet 2 is 3,600 or 1,800 rpm. Meanwhile, a plurality of circular tracks 4 are concentrically formed on the sheet 2 when TV signals are recorded from field to field in a certain modulated, for example, frequency-modulated (hereinafter abbreviated to FM) form by a magnetic head (not shown). By the way, for the above-described recording purpose, the correlation of the magnetic head with the track 4 on the sheet 2 is established by positioning the magnetic head on a radial line F in alignment to the track and bringing it into contact with the sheet 2. As to the accessing the track, it is the general practice that one magnetic head is moved along the line F. In order to prevent crosstalk between tracks, a guard band 6 is provided in between any two adjacent tracks 4. In this guard band 6, generally nothing is recorded.

FIG. 7 is a fragmentary cross-sectional view illustrating the relationship between the magnetic sheet 2 and the magnetic head 8. The magnetic head 8 is arranged in alignment with a desired one of the tracks 4 on the magnetic sheet 2. Meanwhile, the magnetic sheet 2 is rotating at a speed of 3,600 rpm or 1,800 rpm. Hence, an air flow is produced to effect a broken contact between them through a very thin air gap 10.

According to such a magnetic recording and reproducing form as has been described above, in each track 4, a respective still picture for one field or frame of TV signal can be recorded or reproduced.

Now, with such an apparatus, particularly when in reproduction, for good reproduced signals to be obtained, not just the requirement that the touching of the magnetic head 8 to the magnetic sheet 2 is sufficient, but the requirement of bringing the magnetic head 8 into accurate alignment with the track 4 on the magnetic sheet 2 must be fulfilled. In general, however, as the magnetic head 8 while being moved along the line F of FIG. 6 comes across a desired one of the tracks 4, an accurate positioning (hereinafter referred to as "tracking") is very difficult to perform, because the mechanical tolerances are one-sided and there is some looseness. Such a tracking error is apt to occur when the reproducing is carried out by using a different apparatus from that used when recording. Even if the mechanical tolerances are cancelled out, for the magnetic sheet 2 having a property of being liable to expand or contract with variation of temperature, such an error will sometimes happen as the temperature is so much changed.

To cope with the above-described problem, a necessity arises that a control be made by moving the magnetic head 8 in either of the directions indicated by arrows A and B to effect an accurate on-track of the magnetic head 8. Such a control is generally known as the auto-tracking.

Such an auto-tracking, in many cases, is performed by positioning the magnetic head 8 in such a position that the reproduced output of the magnetic head 8 becomes maximum.

In that case, the point at which the level of the reproduced RF signal is detected is one in number per revolution of the magnetic sheet and its phase is determined based on the timing of the VD (vertical synchronizing) signal. And, the above-described auto-tracking is operated in a manner which is generally called "mountain climbing control method", as follows: While the magnetic head 8 is being moved a very short distance stepwise for each revolution of the magnetic sheet 2, the levels of the reproduced RF signals produced at the above described respective points on the adjacent two of the revolutions are compared with each other so that the searching is always directed to increase the level of the reproduced RF signal. By taking the point at which this level has once decreased as the maximum, the magnetic head 8 is stopped in this position.

In the mountain climbing control method, however, after the head has once been moved to the target track at a central position B shown in FIG. 8, the auto-tracking is carried out by excursion of the head to the adjacent points A and C to the central one B. In this prior art, therefore, at least four steps of movement of the head: B→C→A→B (on assumption that the maximum is at B) were necessary until the head was stopped.

For this reason, while an inaccurate tracking due to the temperature change or the one-sidedness of the mechanical tolerances did not happen often, although its probability differed with different designs, the use of such a mountain climbing control method for auto-tracking resulted in a large consumption of time, thus giving rise to an alternative problem.

SUMMARY OF THE INVENTION

An object of the present invention is to eliminate the above-described problem and to provide an auto-tracking method which enables the auto-tracking to be performed quickly and a device employing the same.

Under such an object, according to the present invention, the tracking is completed in three steps of movement of the head at a minimum.

Another object of the present invention is to provide an auto-tracking device which can perform auto-tracking more quickly and accurately.

Under such an object, according to a preferred embodiment of the invention, a tracking device is disclosed, comprising means for indicating a target track, detecting means operating in such a manner that, prior to the detecting of a signal of the target track, signals of the adjacent areas to the target track on either side thereof are detected, and, after that, the signal of the target track is detected, and discriminating means for determining the position of the head relative to the recording medium based on the output of the head.

When the indicating means is actuated, the head is shifted toward the target track. As it moves across the central point of the target track, the detecting means detects the signals from the front and rear adjacent points to the central one. Then, as the head is moved backward to the central point, the detecting means detects the signal from the central point. Based on these detected signals, the discriminating means determines the position at which the head is to be stopped relative to the recording medium.

Therefore, according to the tracking device of this embodiment, the head can reach the relative position to the recording medium in three cycles of detecting operation at a minimum. Thus, it is made possible to reduce the necessary number of steps of excursion of the head, while still permitting an improvement of the accuracy of adjustment of the position.

Still another object of the invention is to provide a tracking device suited to an apparatus using a disk-shaped recording medium in which the head is radially moved when it is located in alignment with a target track.

Another object of the invention is to provide a tracking device suited to be used in a apparatus using a disk-shaped recording medium having concentric circular tracks formed thereon, in which the head is moved in a radial direction of the medium, when locating it on the target track.

Other objects and features of the invention will become apparent from the following description of embodiments thereof.

BRIEF DESCRIPTION OF THE DRAWINGS

FIG. 2 is a diagram illustrating the principle of tracking of the invention.

FIG. 3 is a diagram illustrating the method of moving the head up to the fifth step.

DETAILED DESCRIPTION OF THE PREFERRED EMBODIMENTS

Figure 1:
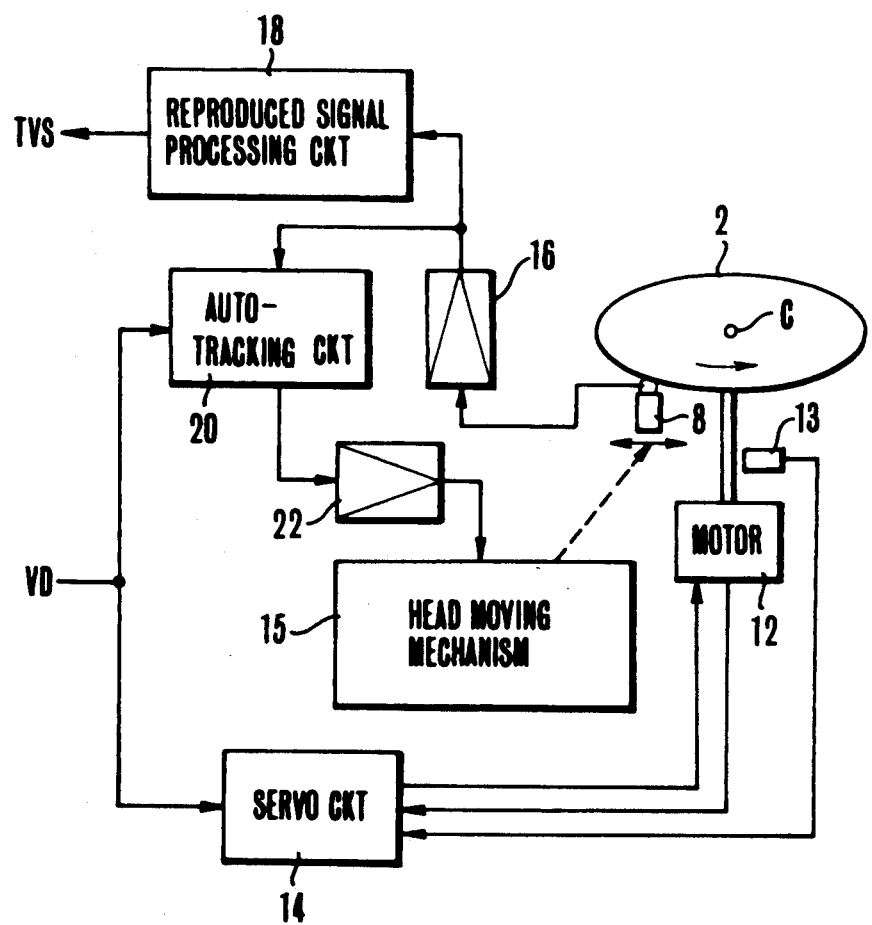
FIG. 1 is a schematic view of an embodiment of the invention.
Figure 4:
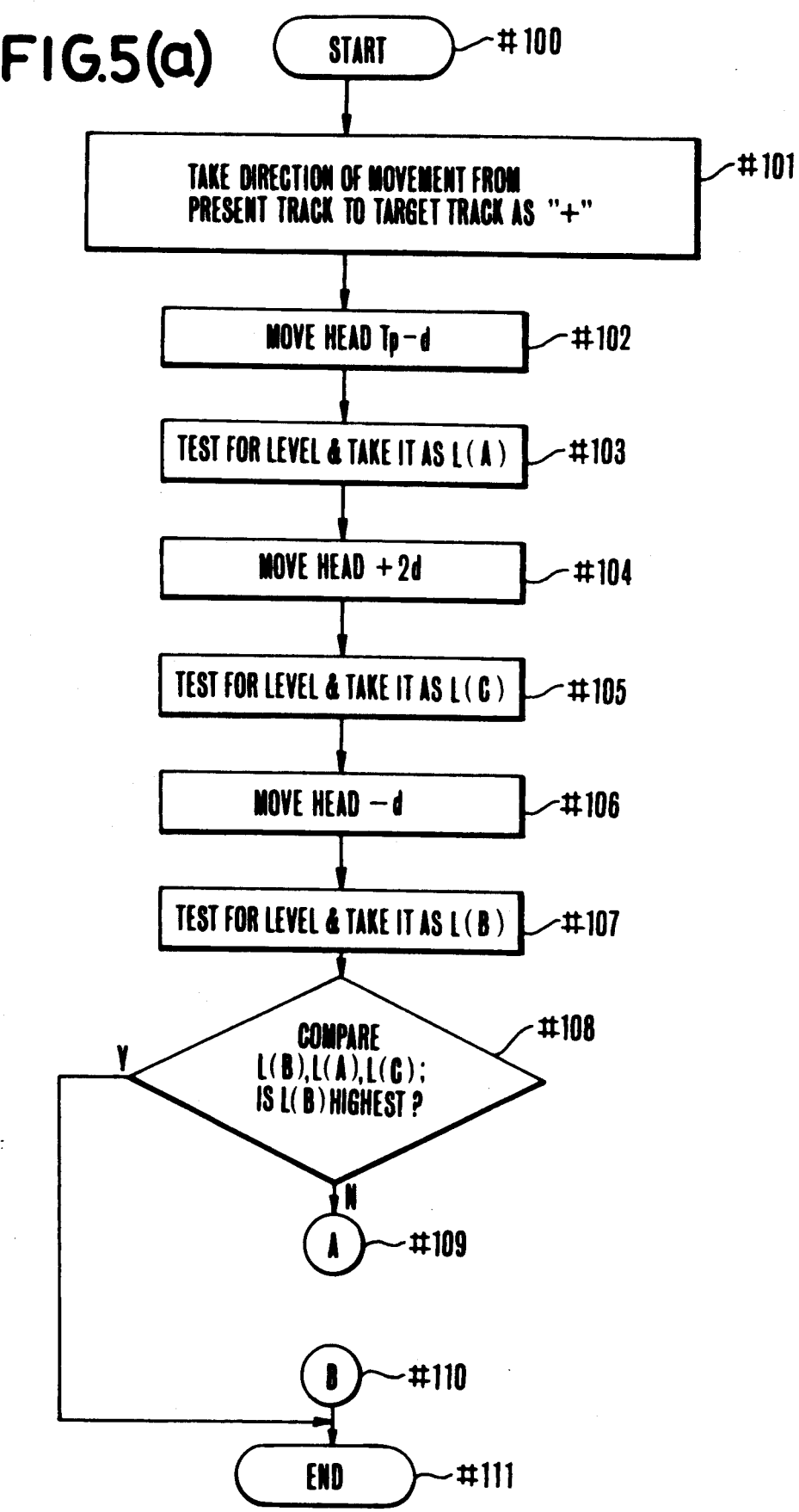
FIGS. 4(a) to 4(d) are diagrams illustrating different manners in which the tracking is operated when the maximum level of signal is found at different points B to E respectively.

FIG. 1 in block diagram exemplifies the auto-tracking device of the invention. For note, it is assumed here that one recorded track of the magnetic sheet 2 stores one field of TV signals. In the drawing, an electric motor 12 constitutes a drive source for rotating the magnetic sheet 2 at 3,600 rpm. A servo circuit 14 has a function of controlling the phase and speed of rotation of the motor 12 in accordance with a signal of the corresponding frequency (FG signal) to the speed of the motor 12 and another signal representing the phase of rotation (PG signal) which is produced in the form of one pulse per revolution from a phase detector 13. By the way, to allow for the servo circuit 14 to control the phase of rotation of the magnetic sheet 2, the PG signal from the phase detector 13 must be compared with a signal representing one field period of the TV signal. For this purpose, the signal VD is supplied. A pre-amplifier 16 amplifies the signal read out from the magnetic head 8. Also, a reproduced signal processing circuit 18 demodulates the reproduced RF signal from the pre-amplifier 16 and produces its output as the TV signal TVS. Meanwhile, in order to locate the magnetic head 8 in such a position that the reproduced RF signal from the pre-amplifier 16 takes the maximum level, an auto-tracking circuit 20 controls the position of the magnetic head 8 relative to the sheet. Position control of the magnetic head 8 to the track is made through an amplifier 22 and a head moving mechanism 15. For note, the mechanism 15 moves the head 8 stepwise in the radial direction of the sheet 2. So, it includes a stepping motor. This stepping motor is arranged so that when it rotates 12 steps, the head is shifted one track.

Next, the tracking method of the invention is explained by using FIG. 2.

Letting the central point of the target track be denoted by B, and nearer and farther points than the point B by one step to and from the head, as it lies at the outer peripheral margin of the disk, by A and C respectively, it is assumed that the signal becomes maximum at the point B. Then, tracking is performed in such a way that, as the head moves in a direction from the outer periphery, the signals from the points A and C are detected successively, and the head is moved backward from the point C to detect the signal from the central point B. (This sequence A→C→B is reversed to C→A→B when the head moves outward). Thus, three steps of movement of the head suffice for completing the auto-tracking. This represents a fundamental operation. Alternatively assuming that B does not give the maximum value, then the head is moved from the point B toward whichever the point A, C gives a signal of higher level by 3d where d is the length of one step. After that, the head is moved backward by 1d. With such an excursion of the head, the above-described discriminating operation is carried out. For a point D of the maximum, as shown in FIG. 3, the excursion goes on in the path: A→C→B→E→D. All different paths of excursion with different points B to E of the maximum are shown in FIGS. 4(a) to 4(d). For note, these are valid when the head moves inward. Conversely when it moves outward, all the paths are inversed with respect to the point C.

Figure 5:
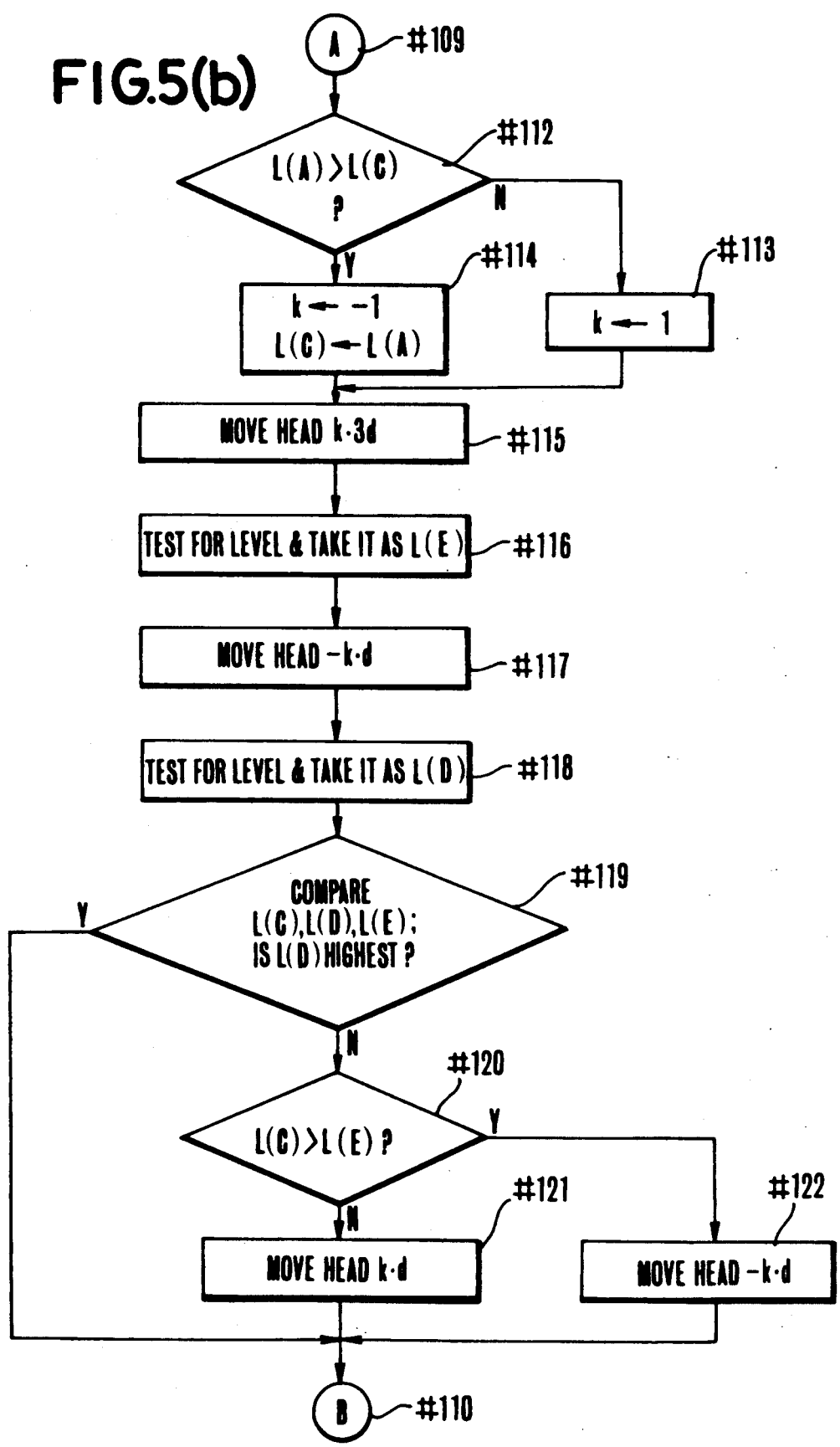
FIGS. 5(a) and 5(b) are flowcharts of an example on application of the invention.
Figure 6:
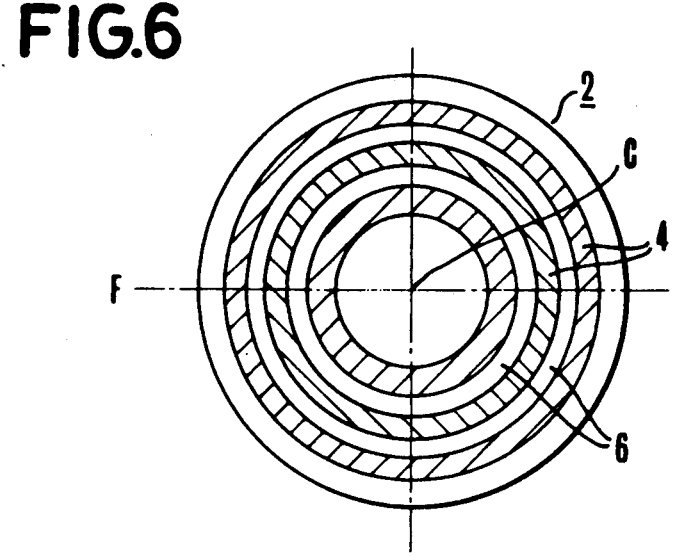
FIG. 6 is a plan view illustrating the structure of the recording medium.
Figure 7:
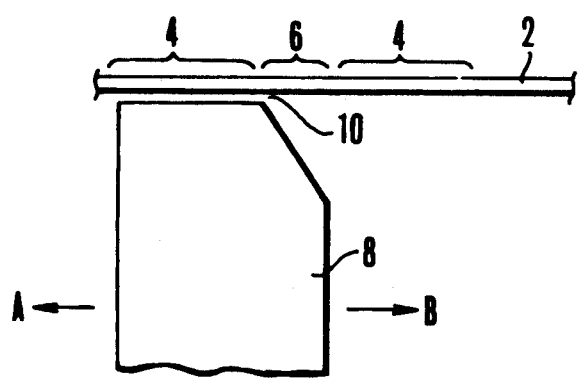
FIG. 7 is a schematic side sectional view illustrating the relationship between the head and the track.
Figure 8:
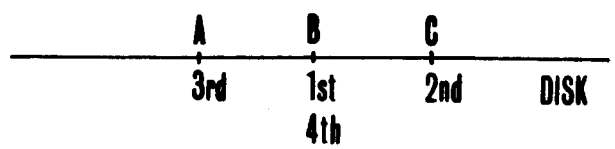
FIG. 8 is a diagram used to explain the prior known tracking method.

An example of the flowchart for such a control operation of the auto-tracking circuit is shown in FIGS. 5(a) and 5(b). In connection with these figures, it is noted that the direction of first movement of the head from the position of the preceding cycle of tracking operation is taken as positive. It is also to be noted that what is called the "level of signal" may be defined in any of a number of ways, as, for example, by the mean value or the peak of all signals over the entire length of the circle of one track, or the level of a signal obtained from an arbitrary point in the circle of one track. Again, in the case when the signal from one point in the circle of one track is read in, it is also possible to use the FG or PG signal obtained from the motor 12 or the phase detector 13 as a control signal for the timing of the sampling of the signal to be read into the auto-tracking circuit 20 shown in FIG. 1.

The operation of the auto-tracking control circuit next is described by using the flowchart of FIGS. 5(a) and 5(b).

The start begins at a step #100. In the next step #101, plus sign (+) is given to the direction in which the head is to move from the present track to a target track.

Then, in a step #102, the head is moved a distance of Tp-d where Tp is the track pitch, and d is the step pitch of the head. In this embodiment, the relationship: Tp=12d is set forth. Now assuming that the previous position of the head is just one track ahead from the point B in FIG. 3, then the execution of the step #102 results in moving the head by 11d and stopping it for the first time at the point A.

Then, in a step #103, the signal level in this head position is detected. This level is denoted by L(A).

Then, in a step #104, the head is shifted by +2d and stopped for the second time at the point C of FIG. 3. The signal reproduced by the head in this position is determined in a step #105 to have a level denoted by L(C).

Then, in a step #106, the head is moved for the third time by −d and stopped at the point B of FIG. 3. And, in a step #107, the signal level in this position is determined, being denoted by L(B).

Then, in a step #108, the levels L(A) to L(C) are compared with one another. Whether or not the level L(B) is highest is tested. If so, then advance to a step #111, and end the program.

Again, if the discrimination in the step #108 has resulted in that the level L(B) is not highest, then advance to a step #109.

For this case, in a step #112, the other levels L(A) and L(C) are compared with each other. If L(C)>L(A), as the on-track position lies nearer to the core of the disk, then set a constant K to 1 in a step #113. If L(C)<L(A) as the on-track position lies on the outer side, then set K=−1 in a step #114 to replace the value of L(C) by L(A).

Then, in a step #115, the head is moved by k·3d. As a result, for L(A)>L(C), the head is shifted 3 steps outward. For L(A)<L(C), it is shifted 3 steps inward. And, in a step #116, the level in this position is memorized as L(E). Then, the head is moved by −k·d (step #117), or returned one step to the opposite direction to that in which the head was moved in the step #115.

And, the level in this position is memorized as L(D) (#118).

Then, the levels L(C)−L(E) are compared with one another in a step #119. If the level L(D) is highest, then advance to the step #110. If not, then test if L(C)>L(E) in a step #120. If L(C)>L(E), then move the head by −k·d and stop it at the point C of FIG. 3 from further excursion. If L(C)<L(E), then move the head by k·d in a step #121 and stop it at the point E of FIG. 3 from further excursion. The step #121 or #122 is followed by the step #110.

In such a manner, in the embodiment of the invention, before the center of the width of the target track is reached, the levels of the signals of its one-step adjacent points on either side are detected in sequence as shown by A→C→B in FIG. 3. Since the probability of obtaining the maximum signal level at the point B is highest, the tracking is completed in a shortest time as will be seen from FIG. 4(a). For note, if the point B is largely offset from the center of the width of the target track which lies, for example, at the point D, the use of the prior known or "mountain climbing control" method would require 6 steps of excursion: A→B→C→D→E→D. If at the point E, 7 steps would be required. In this embodiment, on the other hand, the number of steps is reduced to 5 or 6 respectively, being fewer than in the prior art by one step as is similar to the case of the center at the point B. Except for the case of the center at the point C, where the number of steps is 6 using the method of the invention, being higher by one than in the prior art. In application to a system which resists temperature change so strongly and whose precision accuracy is so high that the signal of maximum level is obtained when the distance the head has moved from the previous reproducing position is equal to an integer times the track pitch, the present invention produces a greatest advantage. Also in application to another system whose mechanical error due to the interchange of jackets is relatively large so that there is a possibility of occurrence of a large difference of the actual track pitch, the present invention produces a great advantage of shortening the time it takes to perform the complete tracking.

Also, when positioning the head on the target track it may be considered that at first the head be moved to the point A shown in FIG. 2, then the tracking signals are detected in the order: A→B→C, and, if B is the maximum level, then the head is returned to B. Such a method of control (type A) is more advantageous at an increase of the tracking speed than that described in connection with the prior art. However, according to this method, though the distance the head moves is the same as that of the method of the invention described in connection with FIG. 2, because the head moving mechanism 15 has a hysteresis (due to the back lash of the gears constituting part of the mechanism 15), the stopped position of the head when returned from C to B is caused to slightly differ from that at which the tracking signal for B had been detected. As a result, the possibility of failing to perform the optimum tracking is increased. To solve this, the control of the type A will occasionally necessitate that when the head is returned to B, the tracking signal be once more detected for affirming the correct position. Therefore the time until the tracking is completed cannot be shortened.

According to the method shown in FIG. 2, on the other hand, since the tracking is operated in such a manner that the detection of the tracking signal of the target position is carried out at the last step, there is no need to affirm operation by detecting the tracking signal when the head is returned to B as in the method of type A.

Also, if the PG signal is used as the sampling timing, according to the method of type A, as the head has moved from A to the position shown by B, when in B, a time (1v period) is waited until the PB signal comes on. Another 1v period is then required for detecting the tracking signal in B. Then, the head is moved from B to a position shown by C, and another time (1v period) is waited in C until the PG signal comes on. Another 1v period is them required for detecting the tracking signal in C. Then, it takes a time almost equal to the 1v period to move the head from C to B. Therefore, according to the method of type A, 5v periods even at shortest in total are required.

According to the method shown in FIG. 2, on the other hand, as the head has moved from A to a position shown by C, a time (1v period) is waited in C until the PG signal comes. Here, the time for the head to move two steps at once is assumed to be shorter than the 1v period. Then, another 1v period is required for detecting the tracking signal in the position shown by C. Then, a more time almost equal to 1v period is required for moving the head from C to B. Another 1v period is required for detecting the tracking signal in the position shown by B. Therefore, in the method shown in FIG. 2, in the shortest case, 41v periods suffice.

Therefore, according to the method shown in FIG. 2, it is possible to perform tracking in a shorter time than when the method of type A is employed.

For note, the above-described method is not confined to the magnetic disk or the auto-tracking device using the stepping motor, but is applicable to other types of tracking devices using an optical disk, ratchet or the like.

Also, though, in the embodiment, Tp=12 d is set forth, and the signal levels of the front and rear 1d adjacent head positions to the target track are detected, Tp and d may otherwise be related to each other than the integer ratio, and the magnitude of d is not necessarily equal to one step of the stepping motor or the like.

As has been described above, according to the present invention, as applied to a system whose precision accuracy is relatively high so that the probability that the tracking signal takes the maximum value at the target track is high, the number of steps of excursion of the head is fewer than in the prior art. Hence, the tracking time can be shortened. Also, despite the fact that high accuracy and quickness of positioning control is indispensable for tracking, the present invention is applicable even to a system whose precision accuracy is relatively low with an advantage of sufficiently shortening the tracking time, for, in most cases, the signal shows the maximum level at the center of the width of the track.

What is claimed is:

1. An automatic tracking device for detecting a level of a signal reproduced from a track on a recording medium by a reproducing head and tracking said head to a position at which the signal takes the maximum level, comprising:
   (a) indicating means for indicating a target track;
   (b) detecting means operating in such a manner that, prior to the detecting of a signal for the logical central position of said target track, signals for positions front and rear adjacent to said logical central position of said target track, respectively, are detected, and, after that, the signal for the logical central position of said target track is detected; and
   (c) discriminating means for determining the best position of said head based on the signals detected at all the aforesaid positions of said head, said discriminating means being arranged to determine a direction for a location of said best position of said head based on said detected signals in the case where said best position of said head is not determined based on said outputs and to displace said head for a predetermined distance in said direction, and to set the position of the head displaced for said predetermined distance in said direction as a new central position and determine the best position of said head on the basis of signals detected at positions front and rear adjacent said new central position and at said new central position.

2. A device according to claim 1, wherein said detecting means detects the signal of a nearer, adjacent position to the target track indicated by said indicating means, then detects the signal of another adjacent position beyond said target track, and then detects the signal of the position of said target track.

3. A device according to claim 2, wherein said detecting means detects the signals reproduced by said head in all said positions, while moving said head.

4. A device according to claim 1, wherein said discriminating means is means operating in such a manner that when the signal level of the position of the target track is highest among the outputs of all said positions, the position of said head is made to coincide with the position of the target track.

5. A device according to claim 1, wherein said recording medium is in the form of a disk.

6. A tracking method comprising:
   (a) a first step of indicating a target track:
   (b) a second step of detecting reproduced outputs at positions front and rear adjacent to a logical central position of said target track by a step of a predetermined movement of a head, respectively;
   (c) a third step that follows said second step of detecting the reproduced output at the logical central position of said target track;
   (d) a fourth step of comparing the respective ones of the reproduced outputs of said logical central position and said front and rear positions to determined an optimum position of said head where the reproduced output of said head is maximum; and
   (e) in the case where the optimum position of the head cannot be determined from these reproduced outputs, discriminating the direction for the location of the optimum position of the head, displacing the head in said direction and then repeating said second step and said third step.

7. A method according to claim 6, wherein said second step includes:
   (A) a step of detecting the reproduced output of a nearer, adjacent position to the position of said target track; and
   (B) a step of detecting the reproduced output of another adjacent position beyond the position of said target track.

8. A method according to claim 6, further comprising:
   (e) a fifth step in which when the optimum position is not determined in said fourth step, said target track is corrected, said fifth step being followed by said first step.

9. An automatic tracking device comprising:
   (a) indicating means for indicating a target track;
   (b) detecting means for detecting signals at positions front and rear adjacent, by a predetermined step of movement of the head, to the logical central position of said target track indicated by said indicating means and then detecting the signal at the logical central position of said target track; and
   (c) discriminating means for determining a position, where the reproduced output of said head is maximum, to be tracked based on the outputs at all the positions detected by said detecting means;
   said discriminating means being arranged, in the case where said position of said head is not determined on the basis of said outputs, to determine a location for said position of said head on the basis of said outputs, to displace the head by the predetermined step of movement and to again discriminate the position of said head where the reproduced output of said head is maximum.

10. A device according to claim 9, wherein said detecting means after having detected the signal of an ahead adjacent position to said target track indicated by said indicating means detects the position of another adjacent position beyond said target track, and then detects the signal of the position of said target track.

11. A device according to claim 9, wherein said discriminating means takes the position of said target track as the position to be tracked when the signal level of the position of said target track is highest among the outputs of all said positions.

12. A method of obtaining an optimum level, comprising:
   (a) a first step of detecting the output level of a head at a position shifted from a logical target position in a first direction by a prescribed distance;
   (b) a second step of detecting the output level of the head at a position shifted from said target position by a predetermined moving amount of the head in the reverse or second direction to said first direction;
   (c) a third step of detecting the output level of the head at said target position;
   (d) a fourth step of determining a position of obtaining the optimum level, where the reproduced output of said head is maximum, from the levels detected by each of said first to said third steps; and
   (e) a fifth step, in the case where said position of obtaining the optimum level cannot be determined in said first to fourth steps, of displacing said head by a predetermined step of movement in said first or second direction and detecting the output level of said head, and setting the position displaced by said determined step as a new target position and repeating the steps from said first step to said fourth step.

* * * * *